(12) United States Patent
Lin et al.

(10) Patent No.: US 7,542,454 B2
(45) Date of Patent: Jun. 2, 2009

(54) MIMO CHANNEL FEEDBACK PROTOCOLS

(75) Inventors: Xintian E. Lin, Mountain View, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 11/040,700

(22) Filed: Jan. 21, 2005

(65) Prior Publication Data
US 2006/0165191 A1 Jul. 27, 2006

(51) Int. Cl.
H04L 1/02 (2006.01)
(52) U.S. Cl. ........................................ 370/338; 370/328
(58) Field of Classification Search ................ 370/204, 370/208, 236, 267, 278, 312, 328, 338, 449
See application file for complete search history.

(56) References Cited

U.S. PATENT DOCUMENTS

| 6,859,503 | B2 | 2/2005 | Pautler et al. |
| 7,120,199 | B2 | 10/2006 | Thielecke |
| 7,406,336 | B2 | 7/2008 | Astely et al. |
| 2003/0087673 | A1 | 5/2003 | Walton et al. |
| 2003/0133469 | A1 | 7/2003 | Brockmann et al. |
| 2004/0066761 | A1 | 4/2004 | Giannakis et al. |
| 2004/0178954 | A1 | 9/2004 | Vook et al. |
| 2004/0196871 | A1 | 10/2004 | Terry |
| 2005/0195905 | A1 | 9/2005 | Kowalski |
| 2006/0182080 | A1* | 8/2006 | Yang et al. .................. 370/347 |
| 2007/0230431 | A1* | 10/2007 | Driesen et al. .............. 370/345 |

FOREIGN PATENT DOCUMENTS

| TW | 0571525 | 1/2004 |
| WO | WO-2006078494 A2 | 7/2006 |
| WO | WO-2006078494 A3 | 7/2006 |

OTHER PUBLICATIONS

*International Search Report and Written Opinion of the International Searching Authority*; Dated Jan. 31, 2006; PCT/US2005/031585, 1-13 Pgs.
"WLAN Access Control Technique", *Modern Electronic Technology*, 27(19), (2004), 78-81,83.
"Taiwan Official Letter dated Nov. 8, 2007", 3 pgs.
"Translation of Taiwan Official Letter dated Nov. 8, 2007", 2 pgs.

* cited by examiner

*Primary Examiner*—Sam Bhattacharya
(74) *Attorney, Agent, or Firm*—The Law Offices of John C. Scott, LLC; John C. Scott

(57) ABSTRACT

Handshaking protocols, techniques, and structures are presented for use in implementing closed loop MIMO using explicit feedback in a wireless network.

35 Claims, 9 Drawing Sheets

MIMO CHANNEL FEEDBACK PROTOCOLS

TECHNICAL FIELD

The invention relates generally to wireless communications and, more particularly, to techniques and structures for implementing closed loop MIMO in a wireless system.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. MIMO may be performed as either an open loop or a closed loop technique. In open loop MIMO, the transmitter has no specific knowledge of the state of the channel before data signals are transmitted to the receiver. In closed loop MIMO, on the other hand, the transmitter uses channel-related information to precondition transmit signals before they are transmitted to better match the present channel state. In this manner, performance may be improved and/or receiver processing may be simplified. There is a need for techniques and structures for efficiently implementing closed loop MIMO in wireless networks.

DETAILED DESCRIPTION

Figure 1:
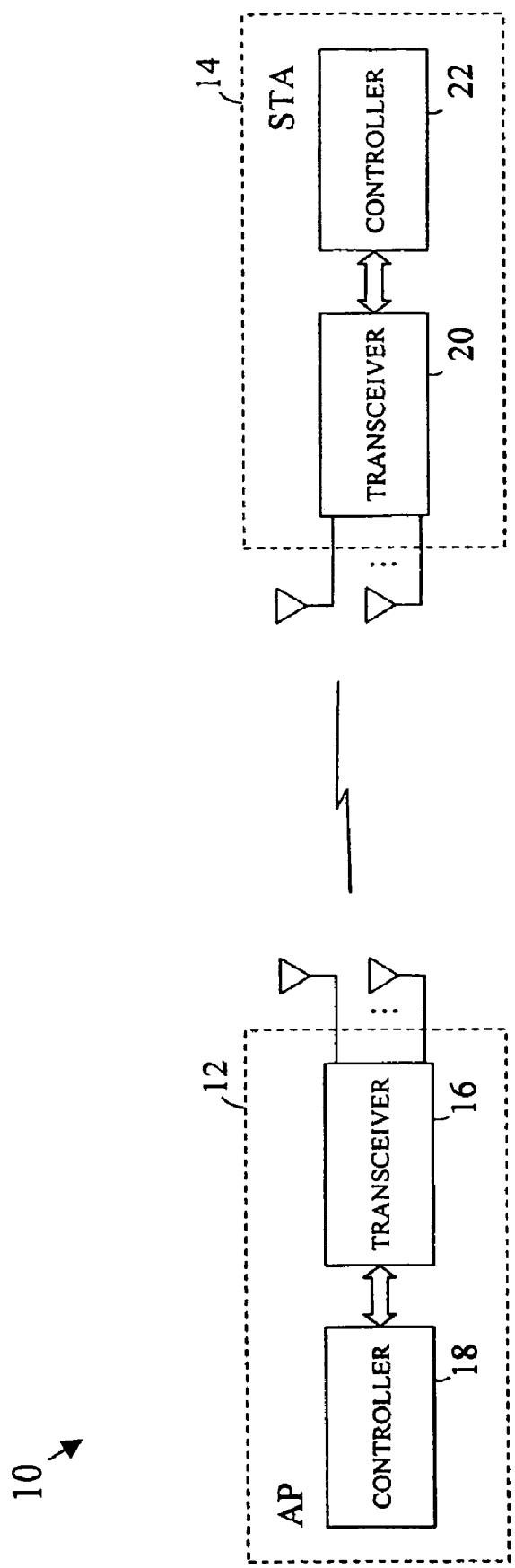
FIG. 1 is a block diagram illustrating an example wireless networking arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques and structures for implementing closed loop MIMO in a wireless network. Closed loop MIMO may be practiced using either implicit feedback or explicit feedback. Implicit feedback relies on the property of channel reciprocity to obtain information about the MIMO channel within a transmitting device. Implicit feedback requires calibrations to be performed for the transmitting device and the receiving device to accurately model the overall channel as a reciprocal component. After calibrations have been accomplished, training signals may be transmitted from the receiving device to the transmitting device to allow the transmitting device to calculate the channel information. The reciprocal property of the channel may then be used to determine the overall channel information in the forward direction from the transmitting device to the receiving device. Explicit feedback transmits training signals in the forward direction from the transmitting device to the receiving device. The channel information is then developed in the receiving device and is transmitted back to the transmitting device to be used in generating subsequent transmit signals. When explicit feedback is used, complicated system calibrations are not required. The present invention presents various handshaking protocols that may be used to implement closed loop MIMO using explicit feedback techniques. These handshaking protocols may be used within, for example, high throughput wireless networks (e.g., the IEEE 802.11n high throughput wireless networking standard currently in development) to provide highly reliable, high throughput operation with relatively low overhead.

FIG. 1 is a block diagram illustrating an example wireless networking arrangement 10 in accordance with an embodiment of the present invention. As illustrated, a wireless access point (AP) 12 is communicating with a wireless station (STA) 14 via a wireless communication link. The wireless AP 12 may be providing access to a larger network (wired and/or wireless) for the STA 14. The STA 14 may include any type of wireless component, device, or system that is capable of accessing a network through a remote wireless access point. Although only a single STA is shown in FIG. 1, it should be appreciated that the wireless AP 12 may be capable of providing access services to multiple STAs simultaneously. As illustrated, the wireless AP 12 and the STA 14 each have multiple (i.e., two or more) antennas. The wireless channel between the AP 12 and the STA 14 is a multiple input, multiple output (MIMO) channel. In the illustrated embodiment, the AP 12 and the STA 14 each have a single set of antennas that may be used for both transmit and receive functions. In other embodiments, the AP 12 and/or the STA 14 may use a different set of antennas for transmit and receive. Any type of antennas may be used including, for example, dipoles, patches, helical antennas, and/or others.

In the embodiment of FIG. 1, the wireless AP 12 includes a wireless transceiver 16 and a controller 18. The controller 18 is operative for carrying out the digital processing functions required to support closed loop MIMO operation for the AP. The controller functions may be carried out using, among other things, one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The controller 18 may also include one or more discrete digital elements such as, for example, bit interleavers, bit de-interleavers, modulation units, demodulation units, discrete Fourier transform units, inverse discrete Fourier transform units, etc. The wireless transceiver 16 is operative for performing the radio frequency (RF) related functions required to (a) generate RF transmit signals for delivery to the multiple antennas during transmit operations and (b) process the RF signals received by the multiple antennas during receive operations. The STA 14 of FIG. 1 also includes a wireless transceiver 20 and a controller 22. These elements will perform functions similar to the corresponding units within the AP 12 (although the AP will typically be capable of supporting multiple simultaneous wireless connections while the STA may only be capable on supporting one). The handshaking procedures and protocols of the present invention may be carried out primarily within the controllers 18, 22 of the AP 12 and the STA 14.

In at least one embodiment, the AP 12 and the STA 14 may use orthogonal frequency division multiplexing (OFDM) techniques. In an OFDM system, data to be transmitted is distributed among a plurality of substantially orthogonal, narrowband subcarriers. The AP 12 and the STA 14 may also implement a form of MIMO known as SVD (i.e., singular value decomposition) MIMO. SVD MIMO will be discussed in greater detail below. Other types of transmit beam forming, such as zero-forcing, can also be applied. To facilitate understanding and simplify notation, the discussion that follows may be with respect to a single subcarrier in an OFDM system. It should be appreciated, however, that the below described functions may need to be performed for each of the subcarriers within a multi-carrier system. Interpolation between subcarriers may also be used to reduce the amount of calculation and feedback.

In a MIMO-based system, a wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be decomposed as follows:

$$H = UDV^H$$

where U and V are unitary matrices (i.e., matrices with orthonormal columns and unit column norm), D is a diagonal matrix, and $V^H$ is the Hermitian of unitary matrix V. A unitary matrix U has the following property:

$$U^H U = I$$

where I is the identity matrix. In the channel matrix decomposition set out above, the matrix V may be referred to as the beam forming matrix (precoder). This beam forming matrix V may be generated in a receiving device by first determining the channel matrix H (using, for example, received training information) and then decomposing the matrix H using SVD techniques (or other similar techniques). The beam forming matrix V (or a portion thereof) may then be transmitted back to the transmitting device to be used in the generation of a subsequent transmit signal. The beam forming matrix can also be computed by other methods. For example, both the receiver and the transmitter may store a predetermined set of beam forming matrixes. The receiver searches for the optimal beam forming matrix within the set. It may first multiply a beam forming matrix in the set with the channel matrix H to emulate a beam formed MIMO channel, and then the receiver may compute the received signal quality of this beam formed channel. By comparing the signal quality associated with the beam forming matrices in the set, the receiver can identify the optimal (or a suboptimal) beam forming matrix in the set and feed the index of the matrix in the set back to the transmitter. The beamforming matrix can then be obtained by the transmitter, which stores the same set as the receiver, using the index. A separate matrix V may be required for each subcarrier in a multicarrier system.

The elements of the diagonal matrix D are known as the singular values, or eigenvalues, of the channel matrix H. The beamforming matrix V is made up of a number of column vectors, known as eigenvectors, that correspond to the eigenvalues. Each of the eigenvectors may define a spatial channel (or eigenmode) within the MIMO channel. The stream of data flowing through a particular spatial channel is known as a spatial stream. The eigenvalues will typically be indicative of the relative strength of the corresponding eigenvectors/spatial channels. Sometimes, it may be advantageous to limit a MIMO channel to only the strongest of the available spatial channels (e.g., to the spatial channels associated with the 2 largest eigenvalues or to the spatial channel associated with the largest eigenvalue). This may, for example, reduce the overall amount of feedback to be delivered to the transmitting device and improve the transmission power efficiency by sending power only over high quality channels.

Figure 2:
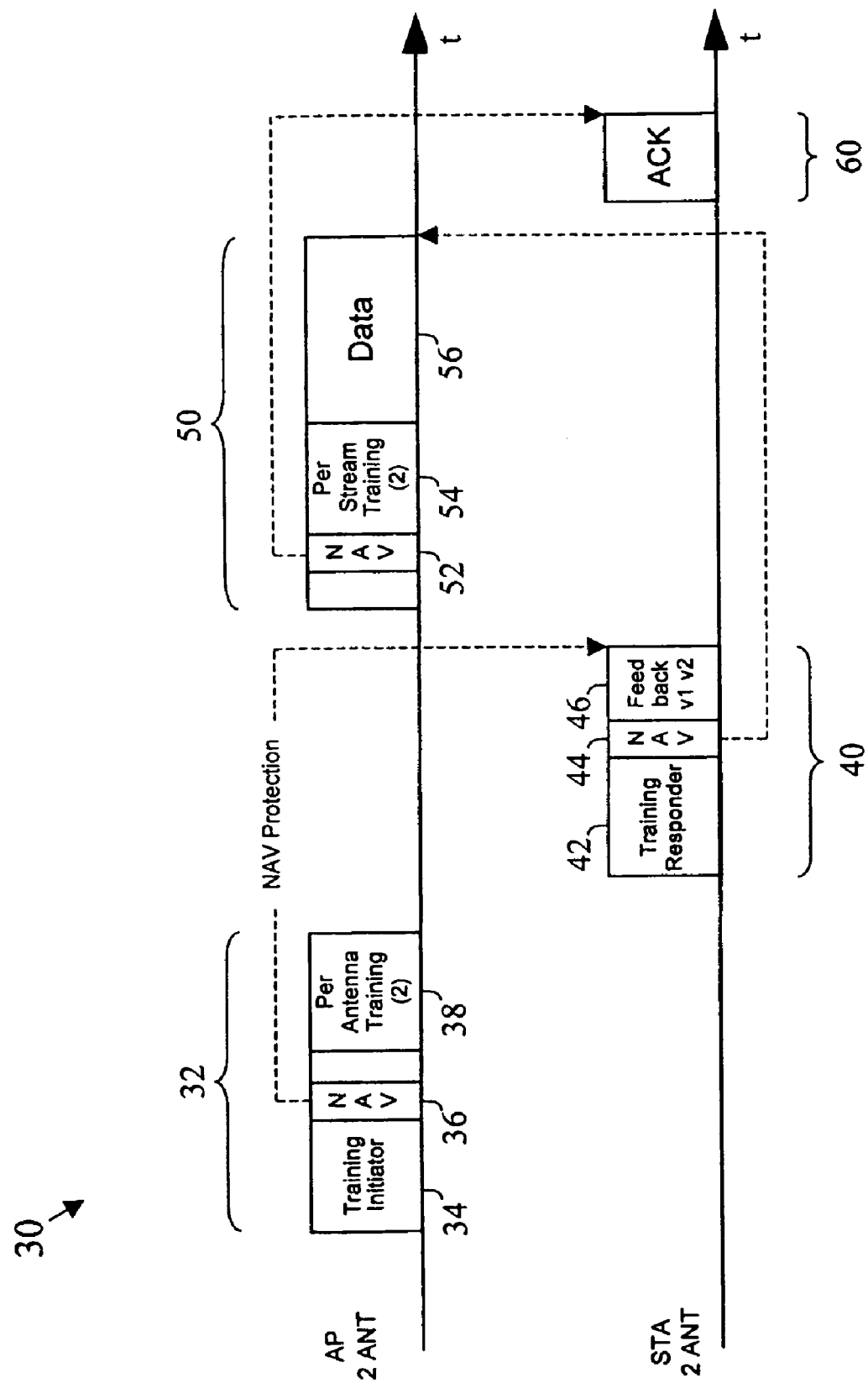
FIG. 2 is a signaling diagram illustrating an example frame exchange sequence that may be used to perform a single down stream data transfer within a MIMO-based wireless network in accordance with an embodiment of the present invention.

FIG. 2 is a signaling diagram illustrating an example frame exchange sequence 30 that may be used to perform a single down stream data transfer within a MIMO-based wireless network in accordance with an embodiment of the present invention. The frame exchange sequence 30 is for use when an AP having two antennas wishes to transmit user data to a STA that also has two antennas. The upper portion of the diagram illustrates the transmissions of the AP (e.g., AP 12 of FIG. 1) and the lower portion illustrates the transmissions of the STA (e.g., STA 14 of FIG. 1). In the frame exchange sequence 30 of FIG. 2, and in the signaling diagrams that follow, it will be assumed that a short inter-frame space (SIFS) may exist between each successive frame in the sequence. A SIFS is a space in the IEEE 802.11 protocols. If a different wireless standard is being implemented (e.g., EEE 802.16, etc.), a different space between transmissions may be used. As illustrated in FIG. 2, the AP first transmits a training initiation frame 32 to the STA. The training initiation frame 32 includes a training initiator field 34 that may include information such as, for example, the address of the STA to which user data is to be transferred, the address of the AP, a request to perform channel training, the amount of data to be transferred to the STA, the number of data frames to be transferred during the frame exchange, and/or other information. In at least one embodiment, the training initiator field 34 may include a description of the type of training to be performed and/or the type of feedback desired (although in other embodiments this information is not included). For example, the training initiator portion 34 may indicate that the eigenvectors associated with the two largest eigenvalues of the MIMO channel are to be returned.

The training initiation frame 32 also includes a network allocation vector (NAV) 36 to indicate an amount of time that the wireless network medium needs to be reserved to allow the subsequent transmission of the STA (i.e., training response frame 40) to be fully transmitted. Other STAs and APs in the region read the NAV 36 within the training initiation frame 32 and subsequently refrain from transmitting signals until after the reserved period has ended. In this manner, collisions may be avoided. Because the AP knows the amount of feedback that will be sent by the STA, it can calculate the size of the NAV that is required to provide collision protection.

The training initiation frame 32 may also include per antenna training 38. The per antenna training 38 may include a separate portion for each of the transmit antennas within the AP. For each antenna, a known training sequence may be transmitted from the AP. The training sequences may then be used by the STA to generate channel information for the corresponding MIMO channel. In some embodiments, a single OFDM symbol is transmitted by each antenna (one after the other) during the per antenna training 38 (although other amounts of data may alternatively be used). In the embodiment of FIG. 2, the AP has two transmit antennas and therefore transmits a training sequence from each of the two antennas during the per antenna training 38.

After the STA receives the training initiation frame 32, it performs the associated channel training and transmits a training response frame 40 back to the AP. The training response frame 40 may include a training responder portion 42 that includes, for example, the address of the requesting AP, the number of spatial streams in the feedback portion 46, the modulation coding scheme suggested to the AP for the data frame 50, the indication of the frame type (i.e., training response), and/or other information. The training response frame 40 may also include a NAV 44 to indicate an amount of time that the wireless network medium needs to be reserved to allow the subsequent transmission of the AP (i.e., data frame 50) to be fully transmitted. As before, other STAs and APs in the region read the NAV 44 within the training response frame 40 and subsequently refrain from transmitting signals until after the reserved period has ended. The training response frame 40 may further include the channel related feedback 46 requested by the AP. This may include, for example, the two eigenvectors $v_1$, $v_2$ of the MIMO channel that were found by performing an SVD operation on the channel matrix H generated using the training signals received from the individual antennas of the AP. Other types of channel related feedback information may alternatively be included.

After the AP receives the training response frame 40, it will transmit a data frame 50. As shown, the data frame 50 may include: a NAV 52, per stream training 54, and user data 56. The NAV 52 may indicate an amount of time that the wireless network medium needs to be reserved to allow the subsequent transmission of the STA (i.e., ACK frame 60 in the illustrated embodiment) to be fully transmitted. The per stream training 54 includes training signals for each of the spatial streams being used. These training signals may be used to perform subsequent channel training, if required, on a spatial stream by spatial stream basis. The user data 56 is the useful data that is being delivered to the STA, as opposed to the overhead data. As used herein, the phrase "user data" may include any type of useful data including, for example, computer application data, text data, graphics data, video data, audio data, voice data, and/or other non-overhead data forms. The channel information received from the STA in the training response frame 40 may be used to precondition the user data 56 and the training signals 54 before transmission. For example, a received beamforming matrix may be used to provide beamforming for the AP when transmitting the user data 56. After the STA receives the data frame 50, it may transmit an acknowledgement (ACK) frame 60 back to the AP to acknowledge that the data frame 50 was successfully received.

In many current and evolving wireless networking standards, adaptive data rates may be used when transferring data in the network. That is, the data rate of the transfer is adapted based on the current channel conditions. Thus, with reference to FIG. 2, the actual length of the data frame 50 transmitted by the AP may depend upon the selected data rate for the user data 56, which will depend upon the current channel conditions. This frame length needs to be known, however, to be able to set the NAV 44 within the training response frame 40. In accordance with at least one embodiment of the present invention, the STA determines the data rate that will be used by the AP to transmit the user data within the subsequent data frame (e.g., data frame 50) based on the channel information determined within the STA using the received training signals. In another embodiment, the STA may estimate the optimal data rate for the AP for user data 56 and feed the data rate back to the AP in frame 40. Once the data rate is known, the overall length of the subsequent data frame may be easily calculated by the STA based on the amount of data to be transmitted (which the STA received previously from the AP). The length may then be used by the STA to calculate the NAV 44. The STA may deliver the data rate information (or corresponding modulation scheme information) to the AP as part of the training response frame 40.

Figure 3:
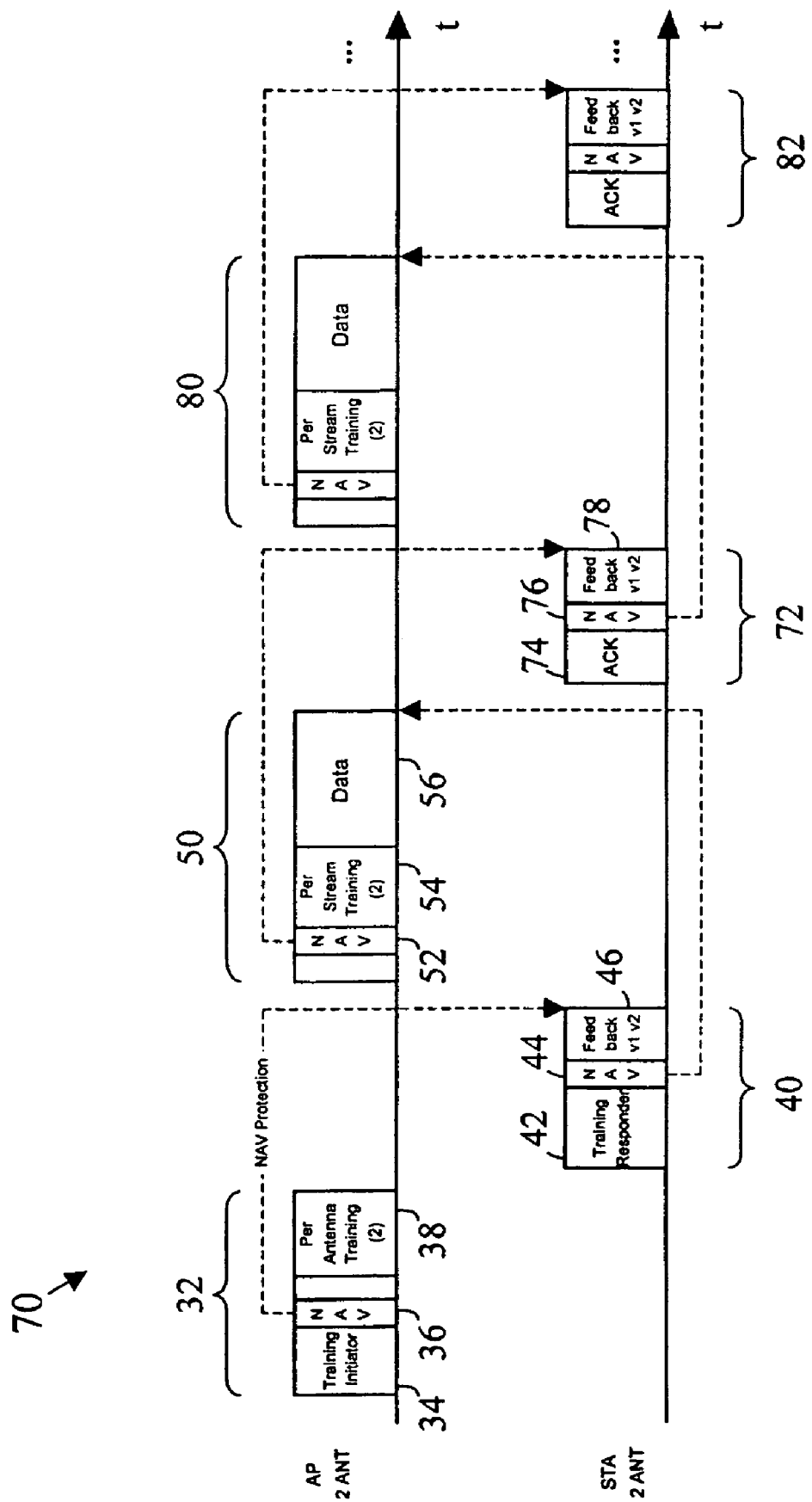
FIG. 3 is a signaling diagram illustrating an example frame exchange sequence that may be used to perform a continuous down stream data transfer within a MIMO-based wireless network in accordance with an embodiment of the present invention.

FIG. 3 is a signaling diagram illustrating an example frame exchange sequence 70 that may be used to perform a "continuous" down stream data transfer within a MIMO-based wireless network in accordance with an embodiment of the present invention. That is, instead of transferring a single data frame from the AP to the STA, the frame exchange sequence 70 of FIG. 3 may send frame after frame in a continuous stream. As in FIG. 2, the frame exchange sequence 70 of FIG. 3 is for use when an AP having two antennas wishes to transmit data to a STA that also has two antennas. The continuous frame exchange sequence 70 starts as before with a training initiation frame 32 transmitted by the AP, followed by a training response frame 40 transmitted by the STA, followed by a data frame 50 transmitted by the AP. The STA may be informed of the "continuous" nature of the present frame exchange within, for example, the training initiation frame 32, although other approaches may alternatively be used (e.g., each successive data frame may inform the STA that another data frame is coming thereafter, etc.). After the data frame 50 has been received by the STA, the STA may use the per stream training 54 within the data frame 50 to again calculate channel related information to be fed back to the AP. As illustrated in FIG. 3, the channel related feedback may be fed back within an ACK frame 72. In at least one embodiment, the channel related information generated in response to the data frame 50 and fed back to the AP is simply a "correction"

to the beamforming matrix used to transmit data frame 50. This beam forming correction matrix may then be matrix multiplied by the previous beam forming matrix (within the AP) to achieve the updated beam forming matrix. In such an approach, the AP must store the most recently used beam forming matrix (for each tone) so that it may be updated. By feeding back matrix corrections within the ACK frames instead of full beam forming matrices, the overall amount of feedback for a continuous frame exchange may be reduced considerably.

In at least one embodiment of the invention, an update of the beamforming matrix for a tone during a continuous exchange is performed as follows. Let the previous channel and beamforming matrices be $H(t-1)$ and $V(t-1)$, respectively, where t is the frame index. The observation of the beamformed channel at the STA after receiving per stream training 54 is $H(t)V(t-1)$. The STA will compute the beamforming matrix for the composite channel $H(t)V(t-1)$ as if $H(t)V(t-1)$ is an ordinary channel without any beamforming. Therefore, the STA doesn't need to remember $V(t-1)$ (though it feeds $V(t-1)$ back in the previous frame). Let $V_c(t)$ denote the beamforming matrix computed by the STA for the composite channel $H(t)V(t-1)$. If channel variation is slow (i.e., $H(t)$ is close to $H(t-1)$), then $V_c(t)$ will be close to the identity matrix and will thus have little information and require a small number of feedback bits. After receiving $V_c(t)$, the AP only needs to update the beamforming matrix by multiplying the feedback $V_c(t)$ with the previous beamforming matrix $V(t-1)$ as $V(t)=V(t-1) V_c(t)$. Therefore, the AP only needs to remember the last beamforming matrix used (i.e., $V(t-1)$) and does not need to remember older matrices (e.g., $V(t-2)$, etc.). This technique may be used in situations where the number of data streams is equal to the number of the transmit antennas (e.g., see FIGS. 3 and 7). For scenarios where the number of data streams is less than the number of the transmit antennas, both the AP and the STA may need to store the previous beamforming matrix.

With reference to FIG. 3, in response to the data frame 50, the STA transmits an ACK frame 72. The ACK frame 72 includes an ACK 74 to acknowledge to the AP that the data frame 50 was successfully received or parts of data 56 were successfully received (for the case where multiple packets are aggregated in data 56.). The ACK frame 72 may also include a NAV 76 to indicate an amount of time that the wireless medium needs to be reserved to allow the subsequent transmission of the AP (i.e., subsequent data frame 80) to be fully transmitted. The amount of data in frame 80 may be indicated in frame 50. As before, the suitable data rate/modulation scheme for the transmission of the data within the subsequent data frame 80 may be determined or estimated by the STA based on the calculated channel information. This data rate information may then be used by the STA to calculate the NAV 76 within the ACK frame 72. The selected data rate/modulation scheme may then be indicated within the ACK frame 72 to be used by the AP. The same approach may also be used with each subsequent ACK frame (i.e., ACK frame 82, and so on). The ACK frame 72 may also include channel related feedback 78 that was generated using the per stream training 54 within the previously received data frame 50. As described above, in at least one embodiment, this may include only a correction to the channel information previously fed back. After the ACK frame 72 is received by the AP, the AP will transmit another data frame 80 after which another ACK frame 82 will be transmitted by the STA. This process may repeat for a predetermined number of iterations. The final ACK frame (not shown) does not need to include a NAV or feedback information (although it may in some embodiments).

In the frame exchange sequences illustrated in FIGS. 2 and 3, the data transfer is a downstream transfer from a two-antenna AP to a two-antenna STA. Similar frame exchange sequences may be performed in the upstream direction from the two-antenna STA to the two-antenna AP for single data frame transfers and continuous transfers. For example, the NAV within a training response frame or an ACK frame transmitted by the AP may be generated in the same manner described above, based on channel information.

Figure 4:
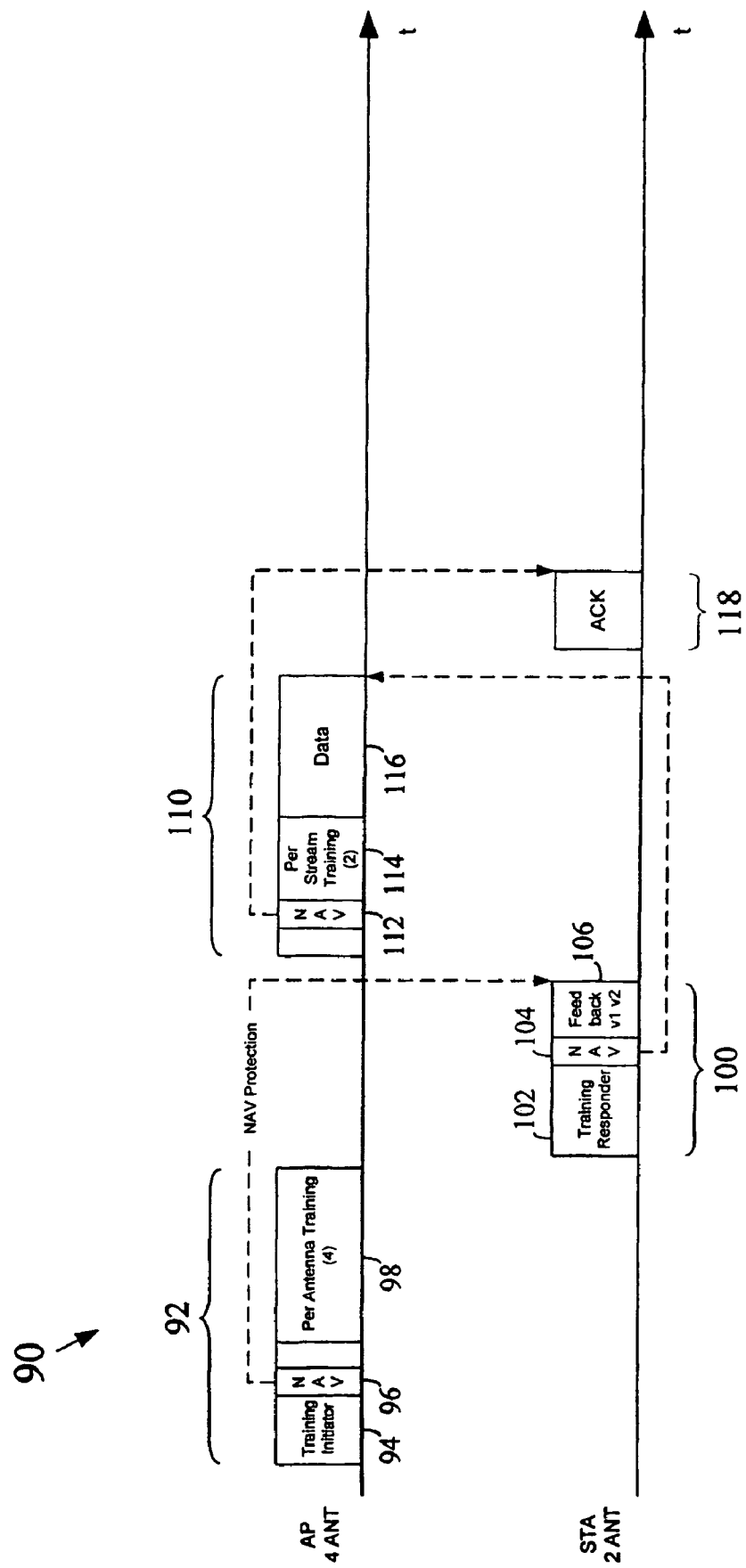
FIG. 4 is a signaling diagram illustrating another example frame exchange sequence that may be used to perform a single down stream data transfer within a MIMO-based wireless network in accordance with an embodiment of the present invention.

FIG. 4 is a signaling diagram illustrating an example frame exchange sequence 90 that may be used to perform a single down stream data transfer within a MIMO-based wireless network in accordance with an embodiment of the present invention. Unlike the previously described sequences, the sequence 90 of FIG. 4 is for use when an AP having four antennas needs to transmit data to a STA that has only two antennas. As illustrated, the AP first transmits a training initiation frame 92 to the STA. The training initiation frame 92 may include, among other things, a training initiator field 94, a NAV 96, and per antenna training 98. These elements are similar to those discussed previously. Because the AP has four antennas, the per antenna training 98 includes transmissions of training signals from each of the four antennas. The STA responds to the AP by transmitting a training response frame 100 that includes a training responder portion 102, a NAV 104, and channel related feedback 106. Because the STA has only 2 antennas, the number of spatial channels identified by the STA may be limited to one or two after the initial training. The corresponding eigenvector(s) may be transmitted back to the AP within the channel related feedback 106 of the training response frame 100 (although other forms of channel related feedback may alternatively be used). As discussed previously, the STA calculates the NAV 104 based on the channel information derived from the per antenna training 98. After receiving the training response frame 100, the AP transmits a data frame 110 that may include, for example: a NAV 112, per stream training 114, and user data 116. The per stream training 114 is for the spatial channel(s) identified within the feedback 106 of the training response frame 100. The data frame 110 is followed by an ACK frame 118 transmitted by the STA. No channel related feedback is included in the ACK frame 118 because no more data is to be transferred to the STA.

If only a single spatial channel is identified by the STA within the training response frame 100, then the STA may indicate that it is only feeding back the beam forming vector or matrix for one spatial channel within the training responder portion 102 of frame 100. The STA may then send the information of the vector or matrix within feedback portion 106. This approach can be generalized to cases with more than 2 antennas and more than 2 spatial channels. The approach may also be used within the frame exchange sequence 30 of FIG. 2. If the beamforming information in feedback portion 106 is only for one spatial stream, then the per stream training 114 may only have training information for one stream since the AP can only generate the beamforming matrix according to what is in feedback portion 106.

Figure 5:
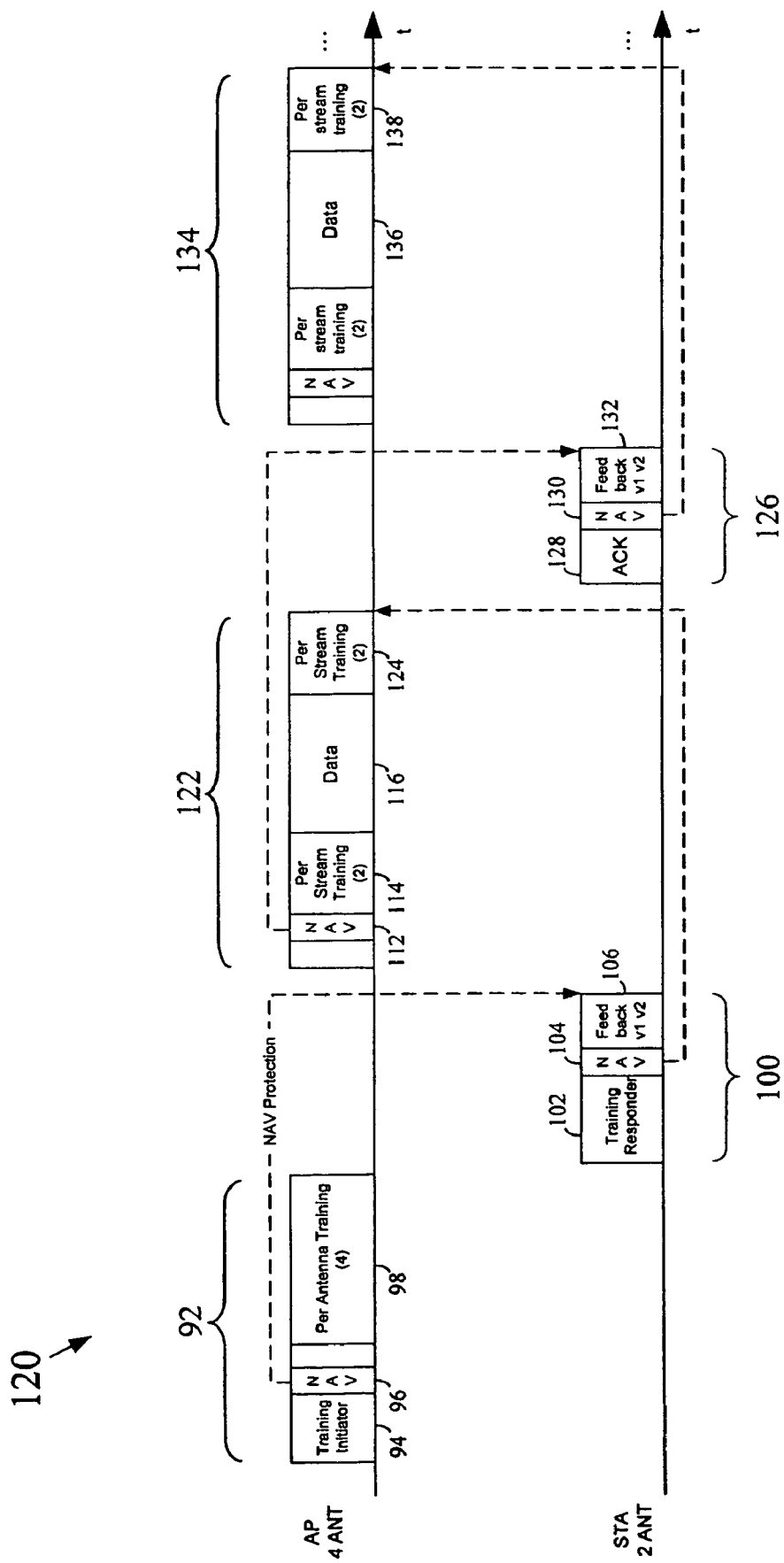
FIG. 5 is a signaling diagram illustrating another example frame exchange sequence that may be used to perform a continuous down stream data transfer within a MIMO-based wireless network in accordance with an embodiment of the present invention.

FIG. 5 is a signaling diagram illustrating an example frame exchange sequence 120 that may be used to perform a continuous down stream data transfer within a MIMO-based wireless network in accordance with an embodiment of the present invention. As with the sequence 90 of FIG. 4, the sequence 120 of FIG. 5 is for use when an AP having four antennas is transferring data to a STA that has two antennas.

The AP first transmits a training initiation frame 92 to the STA, as before. The STA responds to the AP by transmitting a training response frame 100 that includes a training responder portion 102, a NAV 104, and channel related feedback 106. After receiving the training response frame 100, the AP transmits a first data frame 122 that includes a NAV 112, per stream training 114, and user data 116. As described above, the per stream training 114 is for the two spatial channels identified within the feedback 106 of the training response frame 100. In addition to the above, the data frame 122 may also include additional per stream training 124 for two other spatial channels.

In FIGS. 2-7, the maximum number of data streams is equal to the minimum number of STA and AP antennas (i.e., $n_{ds}=\min(n_{RX}, n_{TX})$), where data streams are employed to send user data portions in the frames. The actual number of data streams used (m) can be from 1 to the maximum number $n_{ds}$. If the beamforming information of m spatial streams is fed back, the transmitter may only form m spatial streams to send data. Per stream training 114 in FIG. 5 provides training for the m spatial channels carrying data. Since the transmitter can form $n_{TX}$ eigenmodes or spatial channels, per stream training 124 may be used to provide the training for the ($n_{TX}$–m) spatial channels that do not get trained in training 114. For a channel matrix H of $n_{RX}$ by $n_{TX}$, $n_{ds}=\min(n_{RX}, n_{TX})$ eigenvectors in beamforming matrix V are uniquely determined and ($n_{TX}-n_{ds}$) eigenvectors are not uniquely determined for ($n_{TX}-n_{ds}$)>1.

Figure 7:
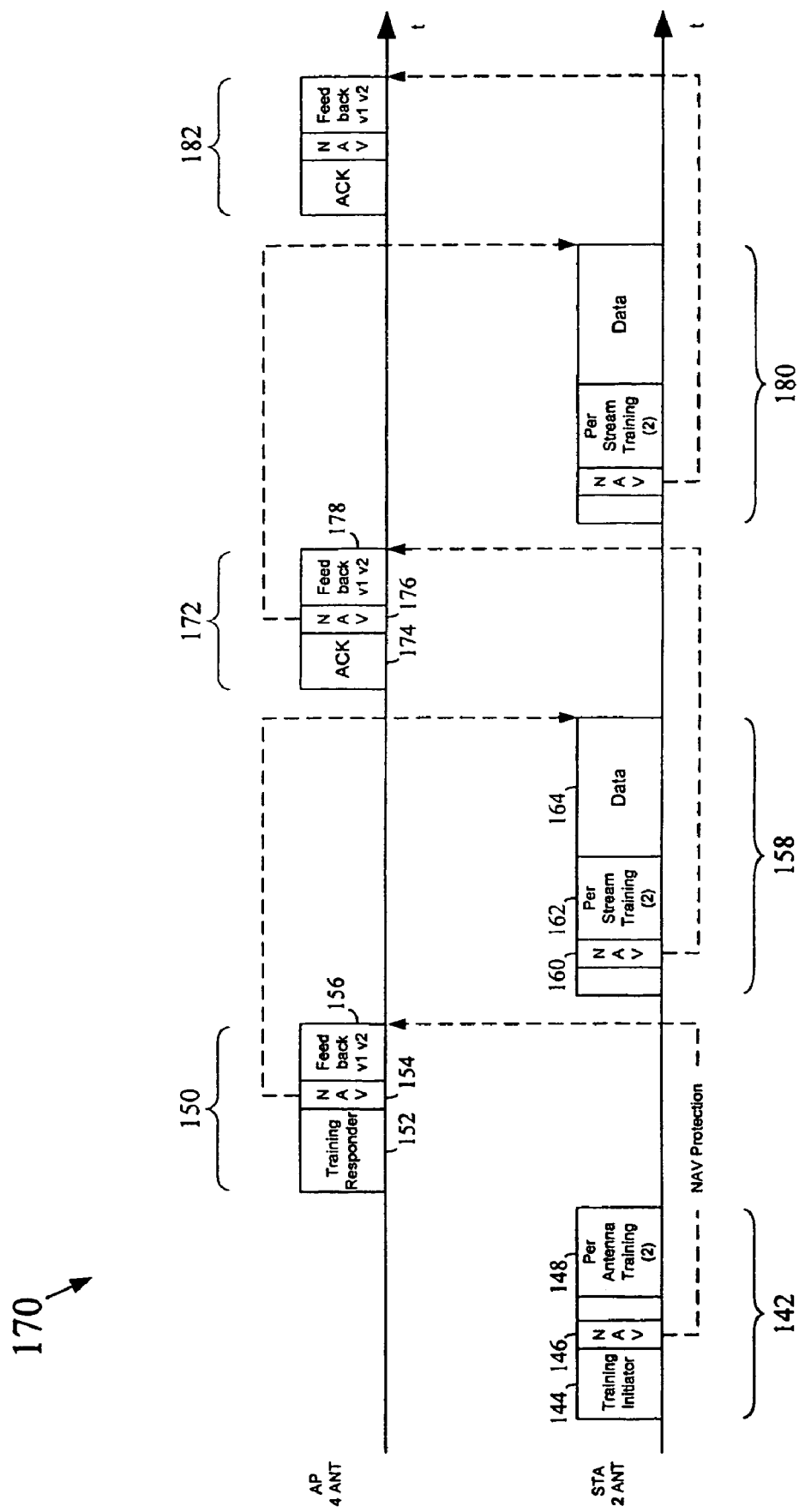
FIG. 7 is a signaling diagram illustrating an example frame exchange sequence that may be used to perform a continuous upstream data transfer within a MIMO-based wireless network in accordance with an embodiment of the present invention.

Since the receive powers at the receiver for the $n_{ds}$ spatial channels are imbalanced especially for the channels corresponding to small eigenvalues, in order to equalize the receive training powers of the unused spatial channels it may be desirable to employ the transformed spatial channels, which are linearly transformed from the spatial channels determined by SVD, in the training 124 instead of using the spatial channels determined by SVD. For example, suppose a 4×4 channel has eigenvalues 4, 3, 2, and 0.5. The spatial channels corresponding to eigenvalues 4 and 3 are selected to carry data in data portion 116 and the spatial channels corresponding to eigenvalues 2 and 0.5 get trained in per stream training 124. Since the receive power of the spatial channel with eigenvalue 2 and the spatial channel with eigenvalue 0.5 differ by 12 dB, the two unused spatial channels may be mixed in the per stream training 124 as follows:

$$[\tilde{v}_{m+1} \ldots \tilde{v}_{n_{TX}}] = [v_{m+1} \ldots v_{n_{TX}}]Q$$

where Q is a ($n_{TX}$–m) by ($n_{TX}$–m) unitary matrix other than the identity matrix; $[v_{m+1} \ldots v_{n_{TX}}]$ are the eigenvectors of V corresponding to the unused channels; V is obtained from the SVD of the channel matrix H; $[\tilde{v}_{m-1} \ldots \tilde{v}_{n_{TX}}]$ are the beamforming vectors (or spatial channels) for the training 124 and 138, etc.; $[v_{m+1} \ldots v_{n_{TX}}]$ are unitary vectors (i.e., they are orthogonal to each other and have unit norm); and $[\tilde{v}_{m+1} \ldots \tilde{v}_{n_{TX}}]$ are also unitary vectors. When the linear transform is not applied, the receive powers of $v_3$ and $v_4$ for per stream training 124 may differ by 12 dB for the example. After transformation, the difference can be reduced since $[\tilde{v}_3 \tilde{v}_4]$ are the linear combinations of $[V_3 V_4]$ and both the eigenvalues of $[V_3 v_4]$ contribute to the receive powers of the per stream training of $[\tilde{v}_3 \tilde{v}_4]$. Therefore, the difference between the receive powers of $[\tilde{v}_3 \tilde{v}_4]$ can be smaller than that of $[v_3 v_4]$. This approach holds for $n_{RX} > n_{TX}$ (e.g., see FIG. 7). In FIG. 7, if only one spatial channel is selected to carry data, then a per stream training needs to be added after data 164 for the other unused spatial channel. It is desirable, but not mandatory, to put the per stream training of the unused spatial channels at the end of the frame because this provides the freshest training of the channel and reduces the delay between training and beamforming.

After the first data frame 122 is received, the STA transmits an ACK frame 126 which includes an ACK 128, a NAV 130, and channel related feedback 132. The AP will then transmit another data frame 134 and the process repeats until all of the data frames have been transferred.

The NAV 104 within the training response frame 100 needs to take into account the additional per stream training 124 within the subsequent data frame 122 to accurately reflect the time needed to reserve the wireless medium for the data frame 122. However, in some situations, it may not be advantageous to include additional per stream training within a data frame. For example, if the channel between the AP and the STA is not changing, or is changing slowly, the other spatial streams will not generally become significant. In at least one embodiment of the present invention, the STA or AP will make a determination as to whether additional per stream training is warranted for a subsequent data frame to be transmitted by the AP and will then generate a corresponding NAV that is in accordance therewith. This determination may be made based upon, for example, past channel history. In one approach, for example, the STA may always instruct the AP to perform the additional per stream training 124 within the first data frame 122. The NAV 104 within the training response frame 100 will then be calculated based on the additional per stream training 124 being present. In generating the first ACK frame 126 (and each ACK frame thereafter), the STA will already know whether the channel is changing quickly or not based on the results of the training performed using the per stream training 124. If the channel is not changing quickly, the STA may decide that additional per stream training is not needed and will instruct the AP (within the ACK frame 126) to not include the additional per stream training within the next data frame 134. If the channel is changing quickly, the STA may decide that the additional per stream training will be beneficial and instruct the AP to include the additional training within the next data frame 134. The STA will determine the value of the NAV 130 based on whether or not the additional per stream training will be included within the subsequent data frame 134. The decision to use or not use additional training may then be carried through for each subsequent data frame until all frames have been successfully transferred. If a large number of data frames are to be transferred within a particular frame exchange sequence, then additional per stream training may be done at intervals to confirm that the channel is still not changing at a significant rate.

The above-described techniques for utilizing additional per stream training are not limited to use when a 4 antenna AP is transferring data to a 2 antenna STA. The techniques may also be implemented, for example, when a 4 antenna AP is transferring data to a 4 antenna STA. It may be desirable to use the spatial channels associated with the largest eigenvalues normally in such a scenario (where the number of spatial channels can one or more than one) and then use additional per stream training when the channel is drifting (e.g., when one mode begins drifting into another mode). The techniques may also be implemented when, for example, a 4 antenna STA is transferring data to a 2 antenna or 4 antenna AP. Other applications also exist.

Figure 6:
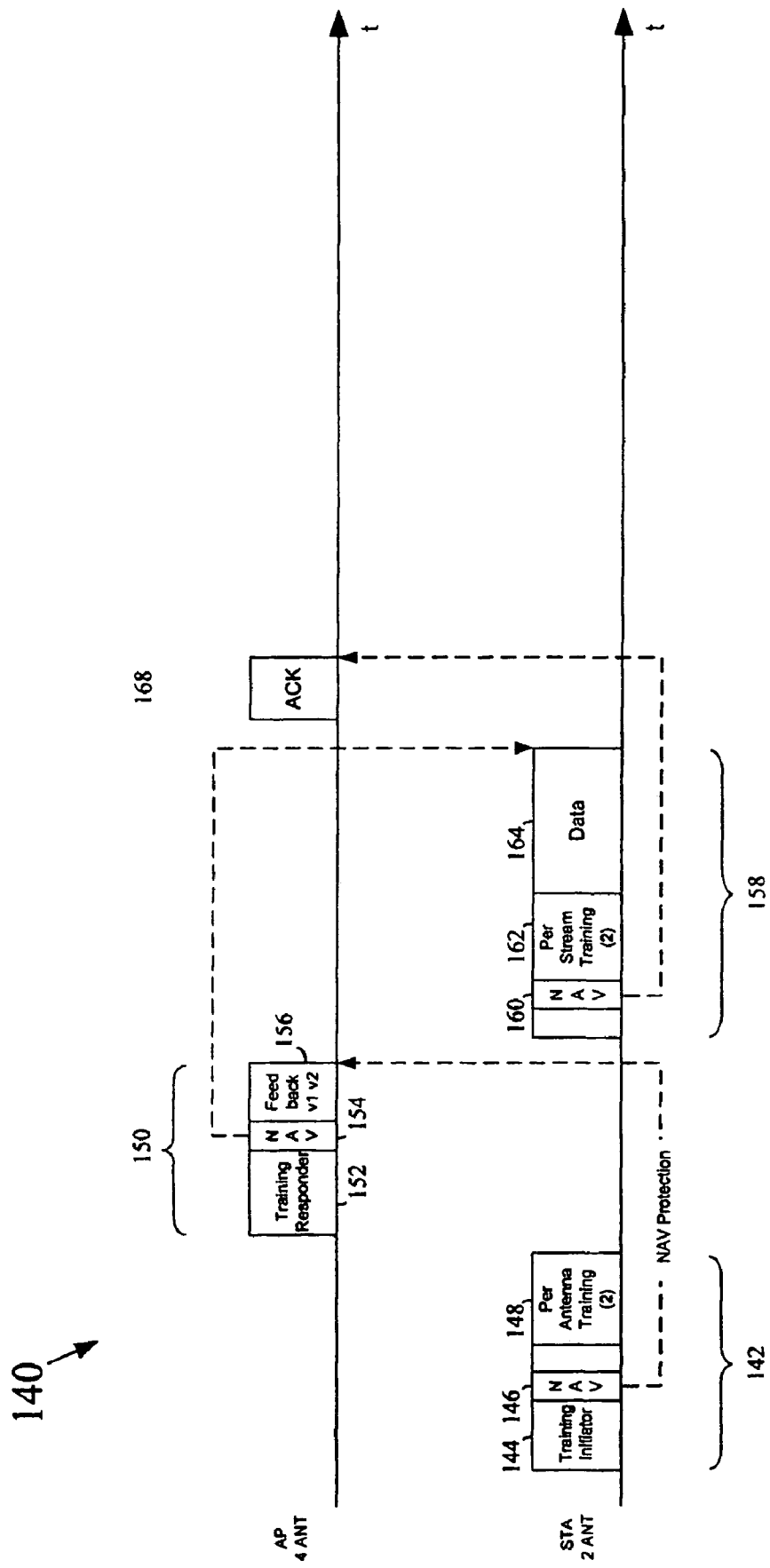
FIG. 6 is a signaling diagram illustrating an example frame exchange sequence that may be used to perform a single upstream data transfer within a MIMO-based wireless network in accordance with an embodiment of the present invention.

FIG. 6 is a signaling diagram illustrating an example frame exchange sequence 140 that may be used to perform a single upstream data transfer within a MIMO-based wireless network in accordance with an embodiment of the present invention. The sequence 140 of FIG. 6 is for use when a STA having two antennas needs to transmit data to an AP that has four antennas. As illustrated, the STA first transmits a training initiation frame 142 to the AP that includes a training initiator field 144, a NAV 146, and per antenna training 148 for the two antennas. The AP performs the requested training and responds to the STA by transmitting a training response frame 150 that includes a training responder field 152, a NAV 154, and channel related feedback 156. The AP uses the channel information resulting from the channel training to determine the data rate/modulation scheme that will be used by the STA to transmit the user data to the AP. The AP takes the data rate into account in the determination of the NAV 154. The AP may deliver the data rate information (or corresponding modulation scheme information) to the STA as part of the training response frame 150. After receiving the training response frame 150, the STA transmits the sole data frame 158 to the AP. The data frame 158 includes a NAV 160, per stream training 162, and user data 164. The user data 164 is transmitted at the data rate determined by the STA. After receiving the data frame 158, the AP transmits an ACK frame 168 back to the STA to indicate that the data frame has been successfully received.

FIG. 7 is a signaling diagram illustrating an example frame exchange sequence 170 that may be used to perform a continuous upstream data transfer within a MIMO-based wireless network in accordance with an embodiment of the present invention. The sequence 170 of FIG. 7 is for use when a STA having two antennas needs to transmit data to an AP that has four antennas. The training initiation frame 142, the training response frame 150, and the data frame 158 are similar to those described above in connection with FIG. 6. Because the STA only has two antennas, there is no issue of transmitting additional per stream training within the data frame 158 as performed in the corresponding downstream scenario. After receiving the data frame 158, the AP transmits an ACK frame 172 back to the STA that includes an ACK 174, a NAV 176, and channel related feedback 178. The STA then transmits another data frame 180 after which the AP transmits another ACK frame 182, and so on. For each ACK frame 172, 182, . . . in the sequence 170, the AP may use the channel information it generates to determine a data rate for a subsequent data frame. The AP may then use the data rate information to calculate a corresponding NAV.

Figure 8:
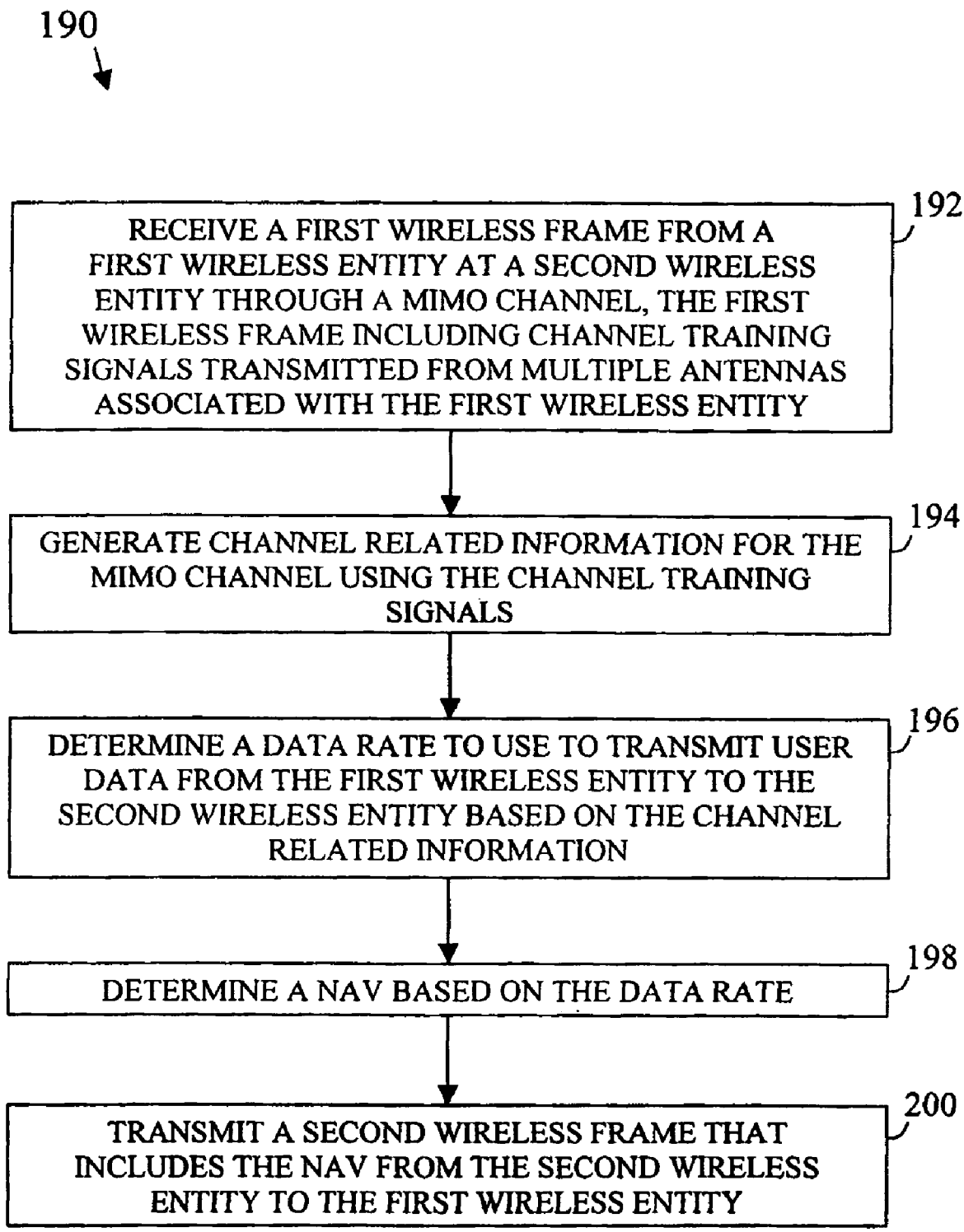
FIG. 8 is a flowchart illustrating an example method for use during a frame exchange sequence within a MIMO based wireless network in accordance with an embodiment of the present invention.

FIG. 8 is a flowchart illustrating an example method 190 for use during a frame exchange sequence within a wireless network in accordance with an embodiment of the present invention. A first wireless frame is received through a MIMO channel from a first wireless entity, by a second wireless entity (block 192). The first wireless frame includes per antenna channel training signals for multiple antennas of the first wireless entity. The second wireless entity then generates channel related information for the MIMO channel using the received training signals (block 194). In at least one embodiment, the channel related information may be generated by first forming a channel matrix H for the MIMO channel and then performing a singular value decomposition (SVD) of the channel matrix H. Other techniques may alternatively be used. A data rate is then determined within the second wireless entity, based on the channel information, for use by the first wireless entity to transmit data to the second wireless entity in a subsequent data frame (block 196). A network allocation vector (NAV) is then calculated based on the data rate (block 198). The NAV is intended to reserve the network medium for a time sufficient to allow the subsequent data frame to be fully transmitted by the first wireless entity.

A second wireless frame that includes the NAV is then transmitted from the second wireless entity to the first wireless entity (block 200). Any other wireless entities in the vicinity may receive the second wireless frame, read the NAV, and then refrain from transmitting until after the associated reservation period (i.e., until after the subsequent data frame has completed transmission). The second wireless frame may also include channel related information for the MIMO channel. The first wireless entity may then transmit a data frame to the second wireless entity. After the data frame is received, an ACK frame may then be transmitted by the second wireless entity to the first wireless entity to confirm that the data frame was received. In at least one implementation, the first wireless entity is a wireless access point and the second wireless entity is a station (see, for example, FIGS. 2, 3, 4, and 5). In other implementations, the first wireless entity is a station and the second wireless entity is a wireless access point (see, for example, FIGS. 6 and 7). Implementations also exist where the first and second wireless entities are both stations or are both access points. Other scenarios are also possible.

Figure 9:
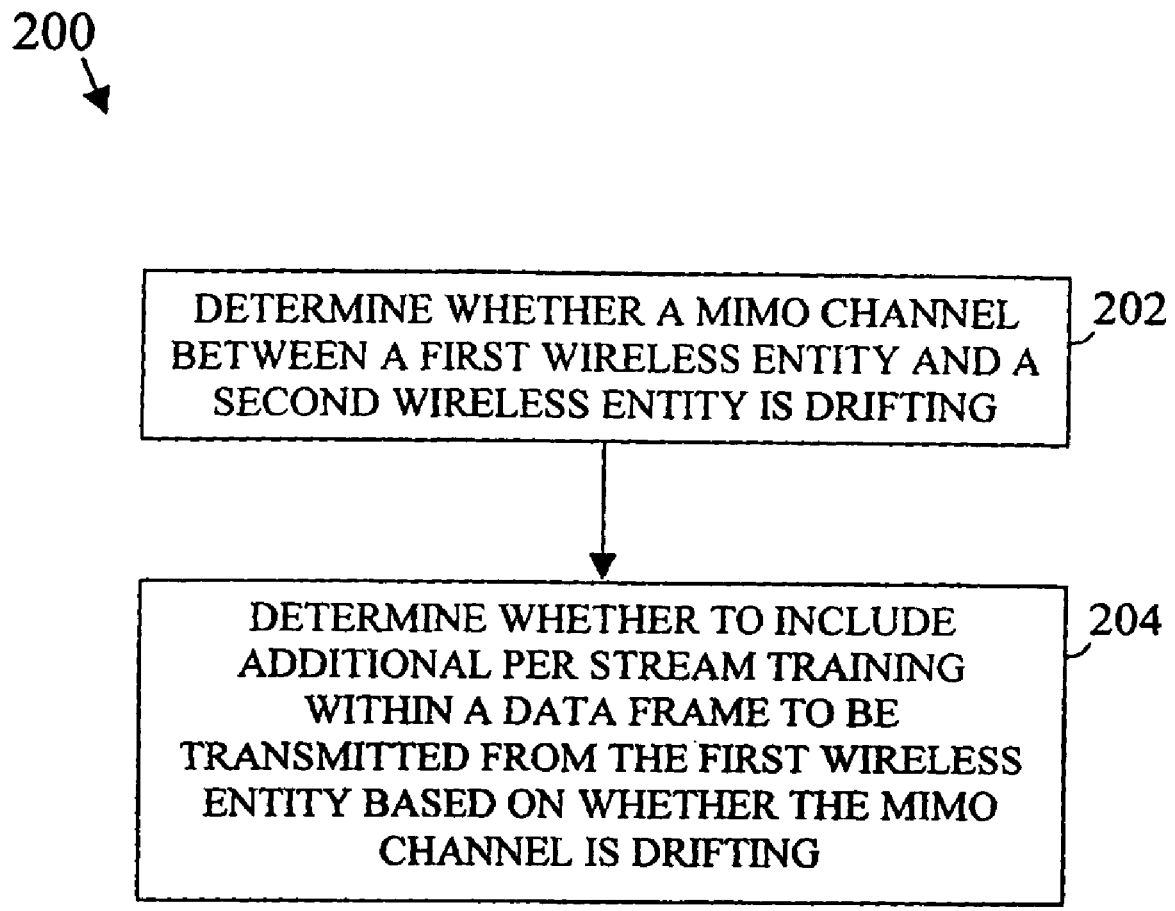
FIG. 9 is a flowchart illustrating another example method for use during a frame exchange sequence within a MIMO based wireless network in accordance with an embodiment of the present invention.

FIG. 9 is a flowchart illustrating an example method 200 for use during a continuous frame exchange sequence within a wireless network in accordance with an embodiment of the present invention. First, it is determined whether a MIMO channel between a first wireless entity and a second wireless entity is drifting (block 202). This may be determined, for example, by examining past channel behavior. In one approach, channel drift is determined to be present if it is found that the MIMO channel meets a predetermined drift criterion (e.g., the channel is changing at greater than a threshold rate, etc.). Other techniques for determining whether the channel is drifting may alternatively be used. Next, it is determined whether to include additional per stream training within a data frame to be transmitted from the first wireless entity to the second wireless entity based on whether the MIMO channel is drifting (block 204). As described previously, the second wireless entity will identify one or more spatial streams to be used by the first wireless entity to transmit user data to the second wireless entity (e.g., channel related feedback 132 of FIG. 5). The first wireless entity will then include per stream training for these one or more spatial streams within the subsequent data frame. The "additional" per stream training will be training for streams other than the one or more spatial streams identified by the second wireless entity.

The channel drift determination may be made within either the first or the second wireless entity. Likewise, the additional per stream training determination may be made within either the first or the second wireless entity. In at least one embodiment, a default per stream training state is used. For example, in one possible approach, additional per stream training (e.g., training 138 in FIG. 5) may always be used unless it is first determined that the channel is not drifting. In a similar approach, additional per stream training may never be used unless it is first determined that the channel is drifting. As described previously, the second wireless entity will need to generate a network allocation vector (NAV) to reserve the wireless network medium until the end of the subsequent data frame. If the additional per stream training determination is made within the second wireless entity, then the second wireless entity may take the determination into account when generating the NAV. That is, the second wireless entity may include the duration of the additional per stream training in the NAV calculation when additional per stream training is to be used and exclude the duration of the additional per stream training when additional per stream training will not be used. If the additional per stream training determination is made within the first wireless entity, then the second wireless entity may always assume the presence of additional per stream training when generating the NAV. In at least one implementation, the first wireless entity is a wireless access point and the second wireless entity is a station. In other implementations, the first wireless entity is a station and the second wireless entity is a wireless access point. Implementations also exist where the first and second wireless entities are both stations or are both access points.

In the description above, terms are used that are typically associated with the IEEE 802.11 wireless networking standard and its progeny. It should be appreciated, however, that the inventive techniques and structures are not limited to use within IEEE 802.11 based systems. That is, the inventive techniques and structures may have application in a variety of different wireless systems and standards.

The techniques and structures of the present invention may be implemented in any of a variety of different forms. For example, features of the invention may be embodied within personal digital assistants (PDAs) having wireless capability; laptop, palmtop, desktop, and tablet computers having wireless capability; pagers; cellular telephones and other handheld wireless communicators; satellite communicators; cameras having wireless capability; audio/video devices having wireless capability; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   receiving a first wireless frame from a first wireless entity at a second wireless entity through a multiple input, multiple output (MIMO) channel, said first wireless frame including channel training data;
   determining channel information for said MIMO channel using said channel training data;
   determining a data rate for said first wireless entity to use to transmit user data to said second wireless entity in a subsequent data frame based on said channel information;
   determining, based on said data rate, a network allocation vector (NAV) to indicate a time period during which a wireless medium is to be reserved to accommodate transmission of said subsequent data frame of said first wireless entity; and
   transmitting a second wireless frame from said second wireless entity to said first wireless entity, said second wireless frame including said NAV.

2. The method of claim 1, wherein:
said channel training data includes per antenna training data from each of a plurality of antennas associated with said first wireless entity.

3. The method of claim 1, wherein:
said second wireless frame further includes channel related feedback information.

4. The method of claim 1, wherein:
said first wireless entity is a wireless access point and said second wireless entity is a wireless station.

5. The method of claim 1, wherein:
said first wireless entity is a wireless station and said second wireless entity is a wireless access point.

6. The method of claim 1, wherein:
determining channel information for said MIMO channel includes generating a channel matrix H for said MIMO channel.

7. The method of claim 6, wherein:
determining channel information for said MIMO channel includes performing a singular value decomposition (SVD) of said channel matrix H.

8. The method of claim 1, wherein:
determining a NAV includes determining a duration of a user data portion of said subsequent data frame by multiplying an amount of data by said data rate.

9. The method of claim 1, wherein:
said first wireless frame is a training initiation frame and said second wireless frame is a training response frame.

10. The method of claim 9, wherein:
said training initiation frame includes another NAV to indicate a time period during which the wireless medium is to be reserved to accommodate transmission of said training response frame.

11. The method of claim 1, further comprising:
receiving said subsequent data frame from said first wireless entity and transmitting an ACK frame to said first wireless entity to indicate that said subsequent data frame has been successfully received.

12. The method of claim 11, wherein:
said subsequent data frame includes another NAV to indicate a time period during which the wireless medium is to be reserved to accommodate transmission of said ACK frame.

13. An apparatus comprising:
a wireless transceiver; and
a controller coupled to said wireless transceiver, said controller being operative to:
   obtain channel training data that was received from a remote wireless entity through a multiple input, multiple output (MIMO) channel;
   determine channel information for said MIMO channel using said channel training data;
   determine a data rate for said remote wireless entity to use to transmit user data to said apparatus in a subsequent data frame based on said channel information;
   determine, based on said data rate, a network allocation vector (NAV) to indicate a time period during which a wireless medium is to be reserved to accommodate transmission of said subsequent data frame of said remote wireless entity; and cause a wireless frame to be transmitted to said remote wireless entity by said wireless transceiver, said wireless frame including said NAV.

14. The apparatus of claim 13, wherein:
said channel training data includes per antenna training data received from each of a plurality of antennas associated with said remote wireless entity.

15. The apparatus of claim 13, wherein:
said wireless frame includes channel related feedback information.

16. The apparatus of claim 13, wherein:
said controller is operative to receive said subsequent data frame from said remote wireless entity and cause an ACK frame to be transmitted to said remote wireless entity by said wireless transceiver to indicate that said subsequent data frame has been successfully received.

17. A system comprising:
at least two dipole antennas;
a wireless transceiver coupled to said at least two dipole antennas; and
a controller coupled to said wireless transceiver, said controller being operative to:
obtain channel training data that was received from a remote wireless entity through a multiple input, multiple output (MIMO) channel;
determine channel information for said MIMO channel using said channel training data;
determine a data rate for said remote wireless entity to use to transmit user data to said system in a subsequent data frame based on said channel information;
determine, based on said data rate, a network allocation vector (NAV) to indicate a time period during which a wireless medium is to be reserved to accommodate transmission of said subsequent data frame of said remote wireless entity; and
cause a wireless frame to be transmitted to said remote wireless entity by said wireless transceiver, said wireless frame including said NAV.

18. The system of claim 17, wherein:
said system is a wireless access point.

19. The system of claim 17, wherein:
said system is a wireless network station.

20. The system of claim 17, wherein:
said wireless frame includes channel related feedback information.

21. The system of claim 17, wherein:
said controller is operative to receive said subsequent data frame from said remote wireless entity and cause an ACK frame to be transmitted to said remote wireless entity by said wireless transceiver to indicate that said subsequent data frame has been successfully received.

22. An article comprising a computer readable storage medium having computer executable instructions stored thereon that, when executed by a computing platform, operate to:
obtain channel training data that was received from a remote wireless entity through a multiple input, multiple output (MIMO) channel;
determine channel information for said MIMO channel using said channel training data;
determine a data rate for said remote wireless entity to use to transmit user data in a subsequent data frame based on said channel information;
determine, based on said data rate, a network allocation vector (NAV) to indicate a time period during which a wireless medium is to be reserved to accommodate transmission of said subsequent data frame of said remote wireless entity; and
cause a wireless frame to be transmitted to said remote wireless entity, said wireless frame including said NAV.

23. The article of claim 22, wherein:
said channel training data includes per antenna training data received from each of a plurality of antennas associated with said remote wireless entity.

24. The article of claim 22, wherein:
said wireless frame includes channel related feedback information.

25. The article of claim 22, wherein said instructions further operate to:
receive said subsequent data frame from said remote wireless entity and cause an ACK frame to be transmitted to said remote wireless entity to indicate that said subsequent data frame has been successfully received.

26. A method for use during a wireless frame exchange, comprising:
first determining whether a MIMO channel between a first wireless entity and a second wireless entity is drifting; and
second determining whether to include additional per stream training data within a data frame to be transmitted from said first wireless entity to said second wireless entity based on whether said MIMO channel is drifting, wherein said additional per stream training data is training data for one or more spatial channels of said MIMO channel that are different from spatial channels selected by said second wireless entity.

27. The method of claim 26, wherein:
first and second determining are performed at said first wireless entity.

28. The method of claim 26, wherein:
first and second determining are performed at said second wireless entity.

29. The method of claim 28, further comprising:
calculating a network allocation vector (NAV), at said second wireless entity, to reserve a network medium until an end of said data frame to be transmitted from said first wireless entity, wherein calculating a NAV includes considering whether additional per stream training data will be included within said data frame.

30. The method of claim 26, wherein:
second determining comprises including additional per stream training data within said data frame by default unless said MIMO channel is not drifting.

31. The method of claim 26, wherein:
second determining comprises not including additional per stream training data within said data frame by default unless said MIMO channel is drifting.

32. The method of claim 26, further comprising:
first determining includes monitoring a past history of said MIMO channel.

33. The method of claim 26, wherein:
first determining includes determining whether said MIMO channel meets a predetermined drift criterion.

34. The method of claim 26, wherein:
said first wireless entity is a wireless access point and said second wireless entity is a wireless station.

35. The method of claim 26, wherein:
said first wireless entity is a wireless station and said second wireless entity is a wireless access point.

* * * * *